United States Patent Office 3,116,106
Patented Dec. 31, 1963

3,116,106
PREPARATION OF HIGH-DENSITY THORIUM OXIDE SPHERES
Robert A. McNees, Jr., and Albert J. Taylor, Oak Ridge, Tenn., assignors to the United States of America as represented by the United States Atomic Energy Commission
No Drawing. Filed Feb. 20, 1962, Ser. No. 174,633
6 Claims. (Cl. 23—14.5)

Our invention relates to the processing of thorium oxide and more particularly to a method for the preparation of high-density thorium oxide spheres.

Thorium is useful as a source of fissionable material, since thorium 232 is converted to fissionable uranium 233 by irradiation with thermal neutrons. This property of thorium is utilized in thermal breeder nuclear reactors in which thorium is irradiated in a blanket region surrounding the reactor core. In one type of breeder reactor thorium oxide pellets are disposed in concentric annular beds surrounding a central cylindrical core through which a uranyl sulfate fuel solution is circulated. The pellet beds are cooled by heavy water which flows upward and outward through or across the beds. The pellets are charged in the beds, periodically rearranged to obtain uniform irradiation and removed by means of water jets. In order to provide suitable heat transfer and to allow movement by water jets, spherical pellets of a uniform size within the range of approximately ⅛ inch to ¼ inch in diameter are employed. Further details concerning this type reactor may be seen by reference to a report, ORNL-2947, issued August 9, 1960, available from the Office of Technical Services.

Preparation of thorium oxide pellets suitable for a pellet-blanket type reactor has presented substantial difficulties. In addition to the pellet size and shape requirements, high density, i.e., at least 9.5 grams per cubic centimeter, and a high degree of resistance to mechanical attrition and chemical damage by circulating water at elevated temperatures are essential to successful operation of this type reactor. Thorium oxide pellets have been prepared by compressing granulated thorium oxide into spherical or near-spherical rounded-end cylindrical shapes and firing the compressed shapes. Pellets prepared at low pressures by these methods, however, are unsatisfactory because of their low density; and, when high pressures are employed to obtain the desired density, the pellets contain cracks and laminations. Excessive mechanical attrition and decrepitation occur upon contacting a bed of these pellets with water at elevated temperatures.

It is, therefore, an object of our invention to provide a method of preparing high-density thorium oxide spheres.

Another object is to prepare thorium oxide spheres suitable for a pellet-blanket type nuclear reactor.

Another object is to provide a method of preparing strong thorium oxide spheres resistant to mechanical attrition.

Another object is to provide a method of preparing thorium oxide spheres approximately ⅛ inch to ¼ inch in diameter.

Other objects and advantages of our invention will be apparent from the following detailed description and claims appended hereto.

In accordance with our invention thorium oxide spheres are prepared by granulating sinterable thorium oxide powder, whereby free-flowing granules are obtained, compressing said granules into uniform-sized cubes having a density of 5.0 to 5.3 grams per cubic centimeter, tumbling said cubes until said cubes are substantially converted to spheres, firing the resulting spheres at a temperature within the range of 1250° C. to 1350° C., polishing the resulting fired spheres, and firing the resulting polished spheres at a temperature of at least approximately 1650° C. Thorium oxide spheres prepared by this method exhibit properties desired for pellet-blanket nuclear reactor use, namely, high density and high resistance to mechanical and chemical attrition in an aqueous system at elevated temperatures. The fine material produced in the tumbling step may be recycled directly to the cube preparation step, thus providing a simple and economical overall process.

Sinterability of the starting thorium oxide powder is critical to the method of our invention, sinterable powder being required in order to obtain high density in the fired product spheres. The term "sinterable thorium oxide powder" as employed in this specification and in the claims appended hereto is intended to refer to thorium oxide powder which when formed into bodies with a bulk green density in the range of 5.0 to 5.3 g./cm.$^3$ sinters to form a coherent mass having a density of at least 9.5 grams per cubic centimeter upon being heated to a temperature of 1750° C. for two hours. Physical properties of sinterable thorium oxide powder as defined herein fall within the following limits: particle size, 1 to 5 microns; surface area, 20 to 40 square meters per gram; and crystallite size, 50 to 5000 angstroms. It is preferred to prepare the starting sinterable thorium oxide powder by calcination of thorium oxalate at a temperature of about 650° C. to 1000° C. Other methods such as calcination of thorium formate or other precipitated salts of thorium with organic compounds may also be employed.

In order to obtain uniform filling of dies and uniform density in the compressed cubes the sinterable powder is granulated to produce free-flowing granules prior to forming the cubes. The method of granulating the sinterable powder is not critical to our invention, and any of the previously known methods may be employed. These methods in general comprise providing a binder in the starting powder, compressing the resulting mixture and comminuting the resulting compact. Conventional binders such as polyvinyl alcohol or stearic acid may be employed; however, the mixture of high molecular weight alcohols available commercially under the trade name "Carbowax 4000" is preferred. The binder is admixed with the starting powder by first wetting the powder, then adding an aqueous solution of the binder and blending the resulting mixture. The proportion of binder provided in the mixture is not critical, but a low level of binder such as 2 grams of binder per 100 grams thorium oxide for "Carbowax 4000" is preferred. The mixture is dried, preferably by heating in air at a temperature of about 80° C., prior to compact formation. The mixture is then compressed, preferably at a pressure of about 15,000 pounds per square inch, to form solid compacts of any convenient size. Free-flowing granules are obtained by comminution of the compacts by means of crushing or grinding to provide particles within the size range of −35 to +200 mesh (U.S. standard). Granules of the desired size may be conveniently obtained by crushing the compact material to pass a 35 mesh screen.

The resulting free-flowing granules are disposed in suitable dies and are compressed to form uniform-sized cubes. Although the apparatus employed is not critical, pressing equipment such as a rotary press with double-acting punches is preferred. The size of the cube-forming die is adjusted, depending on the size spheres desired. The cubes are abraded in the subsequent tumbling step to an extent such that the diameter of the resulting unfired spheres is equivalent to the length of the cube face edges. In selection of the die size, the shrinkage which occurs upon firing the spheres, that is, a decrease in sphere diameter of approximately 20 percent, is also taken into account. Although our invention is not limited to a particular size, this method is particularly applicable to the preparation of spheres ⅛ inch to ¼ inch in diameter. Compression of the cubes to a density of 5.0 to 5.3 grams per cubic centimeter is critical to the provision of the requisite amount of strength to allow formation of spheres upon tumbling, and a density of 5.1 to 5.3 is preferred. The pressure required to produce this density varies with the processing history of the starting sinterable powder and with other factors such as the particular equipment and binder additive employed. For oxide prepared by calcination of thorium oxalate at a temperature of 650° C., a pressure of about 20,000 to 30,000 pounds per square inch normally produces the desired density. Under a given set of conditions the density may be increased by increasing the pressure.

The cubes are them tumbled to form spheres. Tumbling may be effected by disposing the cubes in a cylindrical container and rotating the container, whereby the cubes fall over one another and are abraded. The rotation speed is not critical, but is adjusted to allow the cubes to fall over one another without substantially sliding. The optimum speed varies with the particular apparatus, the amount of material and the cube size. The time required for sphere formation also varies with several factors, including the amount of binder employed in granulating the starting powder, the speed of rotation, the amount of material, and the density of the pressed cubes. Abrasion to spherical form is normally completed in three to four hours.

The apparatus employed for tumbling the spheres is not critical, and conventional equipment such as porcelain-lined mill may be employed, in which case the fine material produced by the tumbling adheres to the wall of the container. In an alternative embodiment, tumbling is effected in a metal cylinder provided with holes of the same diameter as is desired in the tumbled spheres. With this apparatus the fine material is removed continuously and the product spheres are removed when the desired size and shape are attained.

Since the spheres are formed by abrasion of the cubes, a substantial amount, i.e., about 50 percent, of the starting material is converted to abraded, fine material. This material may be recycled and used to make more cubes by granulating in the previously described manner, combining it with fresh free-flowing granules and compressing the resulting mixture to form cubes. This direct recycle of unfired material obviates the necessity of reprocessing or dissolving the fine material and provides a simple and economical overall process.

The resulting spheres are fired to an intermediate temperature and polished prior to final firing in order to obtain a smooth surface. A firing temperature within the range of 1250° C. to 1350° C. is required in this step, and a temperature of approximately 1300° C. is preferred. This temperature range is critical in rendering the spheres hard enough to allow polishing without excessive abrasion. Polishing may be effected by tumbling the spheres alone in the presence of water or tumbling with larger, high-fired thoria or alumina balls. Tumbling the spheres for a period of one to four hours results in a smooth finish.

The polished spheres are then fired to obtain final densification. A temperature of at least approximately 1650° C. is required to produce a density of 9.5 grams per cubic centimeter. Higher firing temperatures may be employed to obtain higher density in the product spheres.

Our invention is further illustrated by the following specific examples.

*Example I*

Sinterable thorium oxide powder was prepared by calcining thorium oxalate at 850° C. To 4000 grams of this material was added 1200 cubic centimeters of water containing 80 grams of the high-molecular-weight alcohol binder referred to by the trade name "Carbowax 4000" and 150 cc. of pure water. The combined ingredients were then mixed for one hour in a conventional blender and dried in air at 80° C. for 16 hours. The resulting dried material was compressed in a steel die at a pressure of 15,000 pounds per square inch to produce a slug with a density of 4.95 grams per cubic centimeter. The slug was comminuted and screened to produce granules having a size within the range of −35 to +200 mesh (U.S. standard). The granules where then compressed in dies to form cubes with a face edge length of 0.211 inch and a density of 5.2 grams per cubic centimeter. The cubes were placed in a porcelain jar mill and tumbled for 7 hours at a speed of 76 revolutions per minute to produce essentially spherical shapes. The resulting spheres were then heated to a temperature of 1300° C. over a 3½ hour period and held at this temperature for 2 hours. After cooling the spheres were wet-tumbled in a porcelain jar mill for 2 hours at a speed of 140 r.p.m. and were then dried. The dried spheres were heated to a temperature of 1650° C. in a gas-fired furnace for 2 hours. The density of the resulting spherical particles, as determined by water immersion, was 9.6 grams per cubic centimeter and the diameter was .17 inch.

The sintered spheres were then subjected to accelerated attrition testing conducted in the following manner: Approximately 25 spheres were weighed and placed in a 250 milliliter transfer burette provided with a water inlet at the bottom and an outlet at the top. Water was passed upward through the burette with sufficient velocity to continuously lift the spheres to an average height of about 8 to 10 inches. Under these conditions the spheres were vigorously contacted with one another and with the sides of the container. The test was conducted for one hour, after which the spheres were dried and weighed. The test was then repeated for a second hour under the same conditions, and the spheres were again dried and weighed. The weight loss due to attrition was 0.25 weight percent per hour during each test. The spheres were then heated in water at a temperature of 250° C. for 24 hours, and the above-described test was again repeated. The attrition loss after heating in water was not significantly increased over the loss prior to heating.

*Example II*

984 grams of thorium oxide prepared by calcination of thorium oxalate at 850° C. was heated to a temperature of 1000° C. for 2 hours, cooled and combined with 52 grams of an aqueous solution containing 34 weight percent "Carbowax 4000" and 244 grams of additional water. The resulting combination was mixed in a conventional blender. The mixture was then dried overnight at 80° C. and compressed at a pressure of 15,000 pounds per square inch to form a body having a density of 5.4 grams per cublic centimeter. The body was comminuted and screened to produce granules having a size of −35 to +200 mesh (U.S. standard). The granules were compressed in a single-action automatic press to form cubes having a density of 5.2 g./cc. and a face edge length of .211 inch. The cubes were placed in a porcelain jar mill and tumbled at a speed of 76 r.p.m. until essentially spherical shapes were formed. The resulting spheres were heated to 1300° C. in a gas-fired furnace for 90 minutes cooled and polished by wet-tumbling in a porcelain mill for 4½ hours. The polished spheres were then heated in a hydrogen atmosphere at 1800° C. for 2 hours. The density of the resulting sintered pheres, as measured by water immersion, was found to be 9.74 g./cm.$^3$ The sintered spheres were then subjected to attrition testing in the manner described in Example I. The weight loss was 0.11 weight percent per hour, both before and after heating in water.

The results obtained in the above examples indicate that the high-density spheres prepared by the method of our invention possess a high degree of resistance to mechanical attrition and are thus suitable for use in nuclear reactor pellet beds. The severe attrition conditions employed in these tests result in an attrition rate 10 to 100 times the rate expected for the same spheres in nuclear reactor pellet beds.

The above examples are merely illustrative and are not to be understood as limiting the scope of our invention, which is limited only as indicated by the appended claims. It is also to be understood that variations in apparatus and procedure may be employed by one skilled in the art without departing from the scope of our invention.

Having thus described our invention, we claim:

1. The method of preparing high-density thorium oxide spheres which comprises providing a binder in thorium oxide powder prepared by calcination of thorium oxalate at a temperature within the range of approximately 650° C. to 1000° C., compressing the resulting mixture to form solid compacts, comminuting said compacts to obtain particles having a size within the range of −35 to +200 U.S. standard mesh, compressing said particles into uniform-sized cubes having a density of 5.1 to 5.3 grams per cubic centimeter, tumbling the resulting cubes until said cubes are substantially converted to spheres, firing said spheres at a temperature within the range of approximately 1250° C. to 1350° C., polishing the resulting fired spheres and firing the resulting polished spheres at a temperature of at least approximately 1650° C.

2. The method of claim 1 wherein the face edge length of said cubes is within the range of approximately ⅛ inch to ¼ inch.

3. The method of preparing high-density thorium oxide spheres which comprises granulating thorium oxide powder having a particle size of about 1 to 5 microns, a surface area of about 20 to 40 square meters per gram and a crystallite size of about 50 to 500 angstroms whereby free-flowing granules are obtained, compressing said granules into uniform-sized cubes having a density of 5.0 to 5.3 grams per cubic centimeter, tumbling said cubes until said cubes are substantially converted to spheres, firing the resulting spheres at a temperature within the range of approximately 1250° C. to 1350° C., polishing the resulting fired spheres and firing the resulting polished spheres at a temperature of at least approximately 1650° C.

4. The method of preparing high-density thorium oxide spheres which comprises granulating thorium oxide powder prepared by calcination of thorium oxalate at a temperature of about 650° C. to 1000° C. whereby free-flowing granules are obtained, compressing said granules into uniform-sized cubes having a density of 5.0 to 5.3 grams per cubic centimeter, tumbling said cubes until said cubes are substantially converted to spheres, firing the resulting spheres at a temperature within the range of approximately 1250° C. to 1350° C., polishing the resulting fired spheres and firing the resulting polished spheres at a temperature of at least approximately 1650° C.

5. The method of claim 4 wherein the face edge length of said cubes is approximately ⅛ to ¼ inch.

6. The method of claim 4 wherein said resulting spheres are fired at a temperature of approximately 1300° C.

References Cited in the file of this patent

AEC-Document, ORNL–2947, pp. 113 and 115, issued Aug. 9, 1960.

AEC-Document, ORNL–3167, pp. 110–113, issued Sept. 6, 1961.